United States Patent
Sehlhoff et al.

(10) Patent No.: US 12,510,414 B2
(45) Date of Patent: Dec. 30, 2025

(54) OPTICAL ELEMENT FOR A MOTION DETECTOR

(71) Applicant: STEINEL GMBH, Herzebrock-Clarholz (DE)

(72) Inventors: Stefan Sehlhoff, Herzebrock-Clarholz (DE); Torsten Born, Oerlinghausen (DE)

(73) Assignee: STEINEL GMBH, Herzebrock-Clarholz (DE)

( * ) Notice: Subject to any disclaimer, the term of this patent is extended or adjusted under 35 U.S.C. 154(b) by 186 days.

(21) Appl. No.: 18/575,417

(22) PCT Filed: Jun. 14, 2022

(86) PCT No.: PCT/EP2022/066107
§ 371 (c)(1),
(2) Date: Dec. 29, 2023

(87) PCT Pub. No.: WO2023/274710
PCT Pub. Date: Jan. 5, 2023

(65) Prior Publication Data
US 2024/0310214 A1    Sep. 19, 2024

(30) Foreign Application Priority Data
Jun. 30, 2021    (DE) .................... 10 2021 116 867.8

(51) Int. Cl.
*G01J 5/0806* (2022.01)
*G01J 5/00* (2022.01)
(52) U.S. Cl.
CPC ........... *G01J 5/0806* (2013.01); *G01J 5/0025* (2013.01)

(58) Field of Classification Search
CPC .............................. G01J 5/0806; G01J 5/0025
See application file for complete search history.

(56) References Cited

U.S. PATENT DOCUMENTS

| | | |
|---|---|---|
| 5,311,024 A | 5/1994 | Marman et al. |
| 5,442,178 A | 8/1995 | Baldwin |

(Continued)

FOREIGN PATENT DOCUMENTS

| | | |
|---|---|---|
| DE | 102006016395 B3 | 7/2007 |
| EP | 0666551 A1 | 8/1995 |

(Continued)

OTHER PUBLICATIONS

International Search Report and Written Opinion dated Aug. 18, 2022 for corresponding application PCT/EP2022/066107.

*Primary Examiner* — David P Porta
*Assistant Examiner* — Fani Polyzos Boosalis
(74) *Attorney, Agent, or Firm* — Bachman & LaPointe, P.C.

(57) ABSTRACT

An optical element (100) suitable for guiding infrared radiation onto an infrared sensor (210) for detecting movements has a first region (110), in which a plurality of first lenses (112) having an aperture from a first aperture range and a focal length from a first focal length range are arranged, and has a second region (120), which lies within the first region (110) and has at least one second lens (122) having an aperture from a second aperture range having values which are greater than the values of the first aperture range, and/or having a focal length from a second focal length range having values which are greater than the values of the first focal length range.

8 Claims, 3 Drawing Sheets

(56) References Cited

U.S. PATENT DOCUMENTS

| | | |
|---|---|---|
| 2010/0270470 A1 | 10/2010 | Sasaki et al. |
| 2013/0043396 A1* | 2/2013 | Shpater ............... G08B 13/193 |
| | | 250/353 |
| 2013/0284932 A1 | 10/2013 | Huang |
| 2016/0369991 A1 | 12/2016 | Lim et al. |

FOREIGN PATENT DOCUMENTS

| | | |
|---|---|---|
| EP | 2246828 A1 | 11/2010 |
| EP | 3828600 A1 | 6/2021 |
| JP | H08-29544 A | 2/1996 |
| JP | H08-146149 A | 7/1996 |

\* cited by examiner

OPTICAL ELEMENT FOR A MOTION DETECTOR

BACKGROUND OF THE INVENTION

The present invention relates to an optical element for an infrared motion detector and an infrared motion detector.

Infrared sensors (IR sensors) are used in a multitude of applications as motion detectors. The operating principle of IR sensors is to detect the heat emitted by an object located in the sensor's field of view in the form of infrared radiation. In particular, a change in the radiation received can be detected, making it possible to detect motion.

Pyroelectric sensors frequently used as IR sensors have two sensor surfaces for this purpose, which can detect the incident infrared radiation. Mediated by a corresponding optical element, these sensor surfaces detect the IR radiation of adjacent spatial regions. A difference in the two signals of the sensor surfaces corresponds to a difference in the temperature of the adjacent spatial regions. If an object moves through these spatial regions, the temperature difference and thus the measured difference signal change. In this way, a pyroelectric sensor can detect motion.

Due to this operating principle, there is the fundamental problem that heat sources, such as persons or animals, moving tangentially past an IR sensor can already be detected at a greater distance than is the case if the motion is radial, i.e., toward or away from the sensor. Therefore, when setting up the motion detector, the different range of the motion detector with respect to radial and tangential motion must always be taken into account, which makes a setup that reproduces the desired detection characteristics difficult.

SUMMARY OF THE INVENTION

It is therefore the object of the invention to enable IR motion detectors that have a radial detection range at least in one direction that corresponds to the tangential detection range. In particular, it is the object of the invention to provide an optical element for an IR motion detector that enables the detection ranges to be matched in at least one direction.

This object is achieved by the subject matter of the independent claims and the subject matter disclosed herein.

An optical element suitable for directing infrared radiation onto an infrared sensor for detecting motion can have a first area, within which a plurality of first lenses with an aperture from a first aperture range and a focal length from a first focal length range are arranged, and can have a second area, which lies within the first area and has at least one second lens with an aperture from a second aperture range with values which are greater than the values of the first aperture range, and/or with a focal length from a second focal length range with values which are greater than the values of the first focal length range.

Thus, an optical element is proposed which consists of different areas or segments with different optical properties with respect to deflection of infrared radiation. A first area consists of commonly used lenses suitable for focusing infrared radiation in a conventional manner onto one or more IR sensors arranged behind the optical element. A second area embedded in the first area consists of one or more lenses having a larger aperture and/or a greater focal length than these standard lenses.

If a lens of the second area has an aperture larger than the standard lenses, more IR radiation reaches the IR sensor through this lens than would be the case with a standard lens. This increases the intensity of radiation on the IR sensor. This results in a greater signal strength, which allows detection of smaller changes in radiation intensity that occur with a radial approach. This increases the sensitivity with respect to radial motion, resulting in an increase in the detection range for radial motion compared to standard lenses. In this way, a radial detection range can be achieved for IR radiation incident through the second area that corresponds to or is equal to the tangential detection range for IR radiation incident through the standard lenses.

Alternatively or additionally, the focal length of the lenses in the second area can also be greater relative to the standard lenses. This results in a higher resolution of the IR radiation detected by the second area. It is thus possible to detect temperature changes in smaller spatial areas. This, in particular, makes it possible to distinguish the legs of a person moving radially towards the optical element. A movement of the legs then also leads to the detection of motion at a greater distance. Thus, even over a greater focal length, an increased radial detection range can be achieved, which corresponds to the tangential detection range in the range of low-resolution standard lenses.

The at least one second lens can protrude from a surface defined by the first lenses in the direction of incidence of the infrared radiation to be directed onto the infrared sensor. By protruding the second lenses from the surface (which may be curved) produced by the first lenses, the distance of the second lens from an infrared sensor located within the optical element can be increased relative to the distance of the infrared sensor from the first lenses. This then allows the focal length of the second lenses to be increased.

The at least one second lens can be a Fresnel lens and the first lenses can be spherical lenses. Fresnel lenses offer the advantage of a very flat design compared to spherical lenses of the same aperture. In addition, Fresnel lenses by comparison have less material and therefore less weight and less optical absorption than spherical lenses of the same aperture. This makes Fresnel lenses particularly suitable for directing increased radiation intensity onto the infrared sensor without excessively attenuating the IR radiation, excessively increasing the weight of the optical element, or compromising the stability of the optical element. The first lenses, on the other hand, can be formed as spherical lenses because of their comparatively small aperture, e.g., in the form of a multi-lens into which the Fresnel lens(es) are recessed. This allows the first area to be designed in a size that enables a wide visual range to be defined, e.g., an all-round view or a viewing angle of 270° or the like.

The optical element can have the form of a partial sphere, preferably a half sphere. This makes it possible to detect motion in all directions if IR sensors arranged within the optical element are appropriately aligned and installed in the ceiling area. In this case, the second area can have a substantially rectangular surface. The second area is then designed as a kind of "viewing window" with an increased radial detection range. The increased radial detection range is thus fixed to a certain solid angle segment, which is also visible from the outside due to the design of the second area. This simplifies the alignment of a motion detector using the optical element. However, the shape of the optical element can also be irregular or represent only part of a sphere or an ellipsoid. Likewise, the second area can be arbitrarily shaped as required.

A device for detecting motion, i.e., a motion detector, can include the optical element described above and at least one infrared sensor for detecting motion onto which the optical element directs infrared radiation. Thus, a motion detector can be produced which has a radial detection range adjusted to the tangential detection range at least in the detection range defined by the second area.

The device can include a plurality of infrared sensors for detecting motion, with the plurality of infrared sensors including first infrared sensors onto which infrared radiation is directed through only a portion of the first lenses, and the plurality of infrared sensors including at least one second infrared sensor onto which infrared radiation is directed through a portion of the first lenses and the at least one second lens. Thus, it can be achieved that the detection range for tangential motion detected by the first infrared sensors is aligned with the detection range for radial motion detected by the at least one second infrared sensor. This allows the second lens of the motion detector to be aligned with areas with an increased number of radial motion to be anticipated, such as access paths or passageways, while the first infrared sensors monitor the periphery through the first lenses. For this purpose, the first and second infrared sensors can also be identical in design, i.e., the alignment of the radial detection range results from the design of the optical element and, if applicable, the arrangement of the IR sensors.

Thus, the minimum distance of the at least one second infrared sensor from the at least one second lens can be greater than minimum distances of the first infrared sensors from the first lenses. Thus, the second IR sensor is spaced further away from the second lens than the first IR sensors are from the associated first lenses. This allows the focal length of the second lens(es) to be increased to increase the resolution achievable by the second IR sensor.

If a central line of sight of the at least one second infrared sensor defines an angle of 0°, a detection range of the at least one second infrared sensor may lie within an angular range of −20° to +20°, and the first infrared sensors can have detection ranges that lie at least partially outside the detection range of the at least one second infrared sensor. Thus, the second IR sensor is focused (in the horizontal plane) on a certain angular segment in which the radial detection range is increased by the optical element. The remaining IR sensors can monitor the remaining angular ranges of the motion detector, e.g., the angles from −180° to −20° and from 20° to 180° for a motion detector with all-round vision. This angle segment is easily recognizable from the outside due to the arrangement of the second lens(es), so that the motion detector can be easily aligned.

The at least one second infrared sensor can have an oblique downward directed viewing angle when the device is mounted as intended. For example, the viewing axis of the second IR sensor can be tilted to the horizontal by about 5° to 25° when the motion detector is mounted for operation, such as by 10°, 15° or 20°, depending on the achievable radial detection range. Thus, an optimal alignment of the second IR sensor is achieved that optimally exploits the potential of the improved radial detection range.

BRIEF DESCRIPTION OF THE DRAWINGS

The present invention is explained in more detail in the following text with reference to the figures. However, the invention is defined by the claims only and is not intended to be limited by the following description of exemplary embodiments.

DETAILED DESCRIPTION

Figure 1:
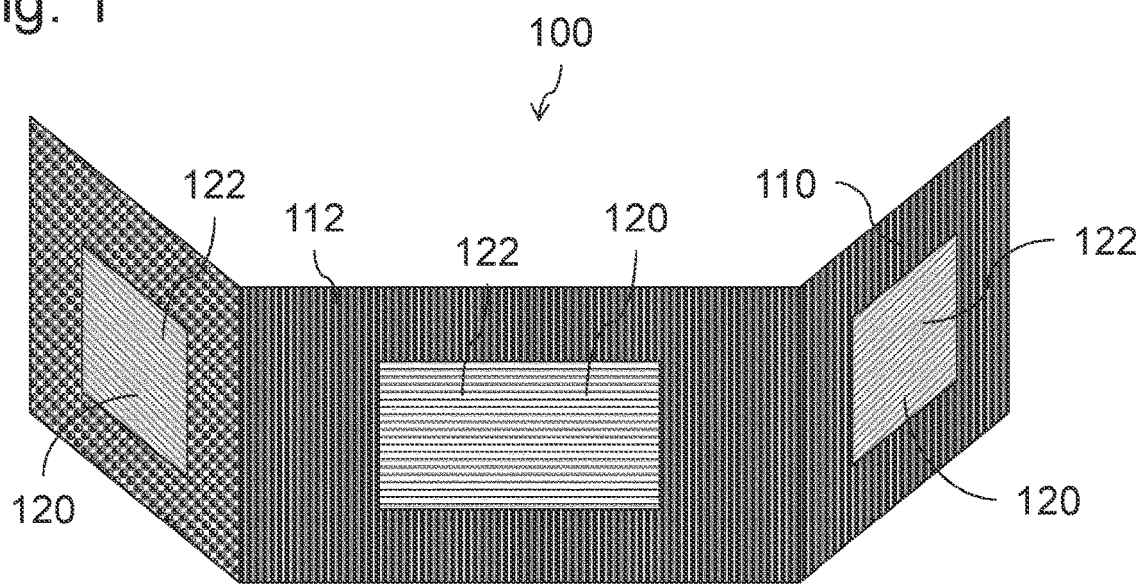
FIG. 1 shows a schematic representation of an optical element.

FIG. 1 shows an optical element 100 suitable for directing or focusing infrared (IR) radiation incident thereon onto IR sensors located behind the optical element 100. The optical element 100 is made of a material that is transparent to IR radiation but refracts it sufficiently to enable deflection of the IR radiation. Any material known from the prior art may be used as the material in this process. Preferably, the optical element is made of HDPE (high density polyethylene).

The optical element 100 has a first area 110 and at least one second area 120 in which the optical element 100 has different diffraction characteristics. The one or more second areas 120 are embedded in the first area 110, i.e., they are completely or partially enclosed by the first area 110.

In the first area 110, the optical element 100 is composed of a plurality of first lenses 112, whereas at least one second lens 122 is arranged within each of the second areas 120. The first lenses 112 have an aperture that lies within a first aperture range and have a focal length that lies within a first focal length range. For example, the apertures of the first lenses 112 can be in the range of 3 mm to 10 mm. The focal lengths of the first lenses 112, for example, can be in the range of 15 mm to 25 mm. The second lenses 122 have an aperture that is larger than the apertures of the first lenses 112 and/or a focal length that is greater than the focal lengths of the first lenses 112. The aperture of the second lenses 122, for example, can be in the range of 10 mm to 30 mm. The focal length of the second lenses 122, for example, can be in the range of 25 mm to 35 mm.

A larger aperture allows more IR radiation to be received by the second lens 122. This allows IR radiation of higher intensity to be directed onto an IR sensor arranged behind the second lens 122. This, in turn, allows variations in intensity that occur during a radial approach to be detected also at a further distance. IR radiation passing through the second lenses 122 thus allows an IR sensor located behind it to operate with an increased radial detection range compared to the first lenses 112.

Alternatively or additionally, the focal length of the second lens(es) 122 may be increased compared to the first lenses 112. Due to a greater focal length, locations emitting IR radiation are imaged at an increased resolution on an IR sensor located behind them. The IR sensor can therefore detect spatial temperature differences in finer detail. This makes it possible to better resolve the silhouette of a radially approaching person even at a greater distance. Movements of the limbs or an enlargement of the silhouette can thus already be detected at a greater distance. This also increases the radial detection range of an IR sensor located behind the second lens 122 compared to the first lenses 112.

An optical element 100 as described above is therefore suitable for increasing the radial detection range in certain angular ranges. For example, it can be aligned with the tangential detection range corresponding to the main part of the optical element 100 defined by the first area 110 or the first lenses 112. In this way, a detection range that is approximately the same for both detection modes can be achieved in certain areas. This simplifies the design of a motion detector using the optical element 100 and the adjustment of the range of such a motion detector.

It goes without saying that the representation of the optical element 100 selected in FIG. 1 is purely exemplary. The overall shape of the optical element 100 can be arbitrarily designed and arranged to the spatial conditions in an arbitrary motion detector. The optical element 100, for example, can be formed as a curved or bent strip, as part of a spherical or elliptical surface (e.g., as a half or quarter sphere), or even as the surface of an irregular body.

The main component of the optical element 100 is constituted by the first area 110. One or more second areas 120 are arranged therein as one or more "viewing windows" with an increased radial detection range, as required. The second lenses 122, in particular, can be designed as Fresnel lenses, while the first lenses 112 are arranged as spherical lenses, for example, in a multi-lens array.

Figure 2:
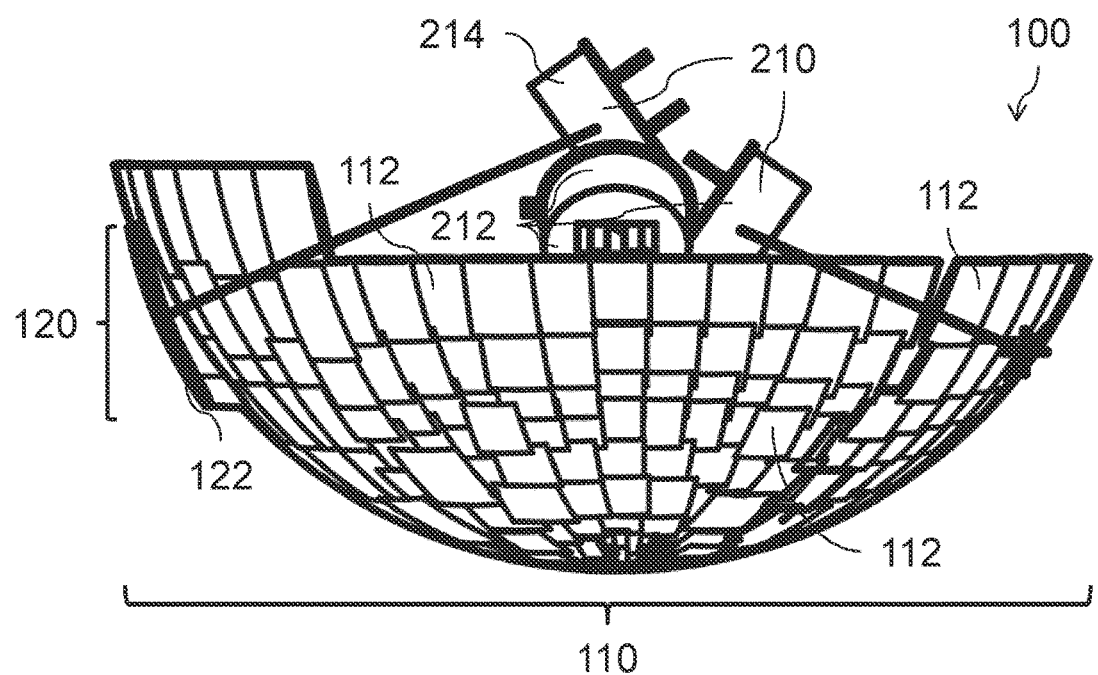
FIG. 2 shows a schematic representation of another optical element.
Figure 3:
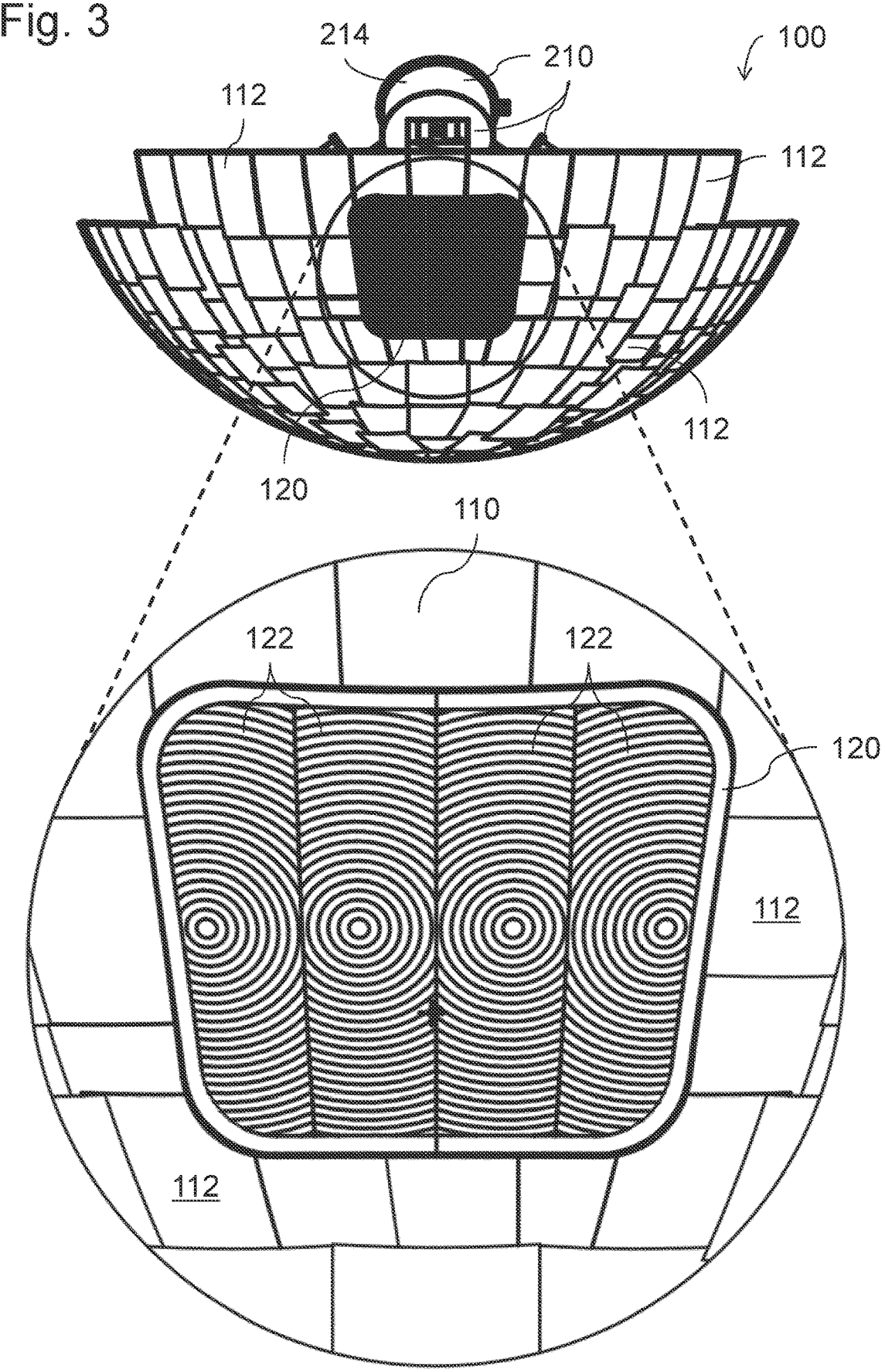
FIG. 3 shows another schematic representation of the optical element from FIG. 2.
Figure 4:
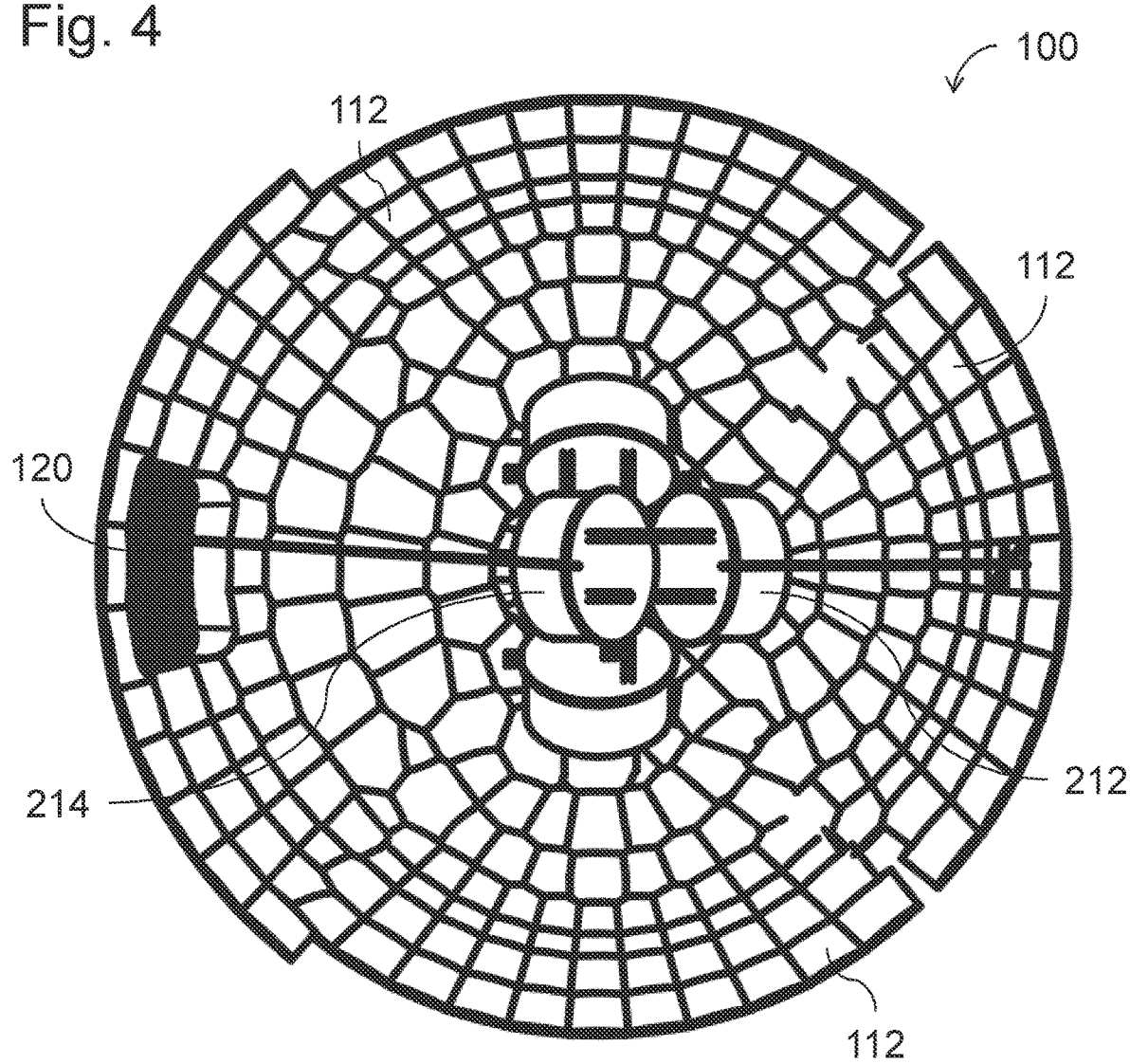
FIG. 4 shows another schematic representation of the optical element from FIG. 2.

Another possible design of an optical element 100 is illustrated together with IR sensors 210 arranged within the optical element 100 in FIGS. 2 to 4. The optical element 100 and the IR sensors 210 arranged therein form the basic components of a device for detecting motion, i.e., a motion detector. For the sake of brevity of the description and since the other components of such a motion detector (e.g., the cabling, a control unit or the like) are known to a person skilled in the art, their description is omitted in the following text. What is decisive is that IR radiation incident on the IR sensors 210 through the optical element 100 can be detected and evaluated as to whether motion has taken place. When motion is detected, the motion detector activates a predetermined process, such as switching on a light, opening a door or gate, summoning an elevator, and the like.

As illustrated in FIGS. 2 to 4, the optical element 100 has a first area 110 that constitutes almost the entire optical element 100 in the form of a partial sphere. A plurality of first lenses 112 is arranged within the first area 110, which are only schematically represented by overlapping polygons in FIGS. 2 to 4. The size and arrangement of the polygons correlates with the position and the aperture of the first lenses 112. The first lenses 112, for example, can be designed as spherical lenses of a multi-lens array.

Recessed into the first area 110 is a second area 120, with a plurality of Fresnel lenses (second lenses 122), as, for example, shown in the magnified section of FIG. 3. The second lenses 122 have an enlarged aperture compared to the first lenses 112, with positive effects resulting from such an enlargement. The aperture (or surface) of the second lenses 122 can be 2 to 5 times the aperture (or surface) of the first lenses 112.

Alternatively or additionally, the second lenses 122 have a greater focal length than the first lenses 112. To make this possible, the second lenses 122 can, on one hand, be moved out from the surface defined by the first lenses 112, as, for example, shown in FIG. 2. However, on the other hand, as is also shown in FIG. 2, the position of the IR sensors 210 inside the optical element 100 can also be adjusted.

In particular, one of the IR sensors 214 (second IR sensor) can be associated with the second area 120, while the other IR sensors 212 (first IR sensors) mediated through the first area 110 cover the remaining monitoring area. The second IR sensor 214 is then spaced further away from the surface defined by the first lenses 112 relative to the first IR sensors, as, for example, shown in FIG. 2, by being arranged further inward and further upward than the first IR sensors 212.

By moving the second lenses 122 out from the surface defined by the first lenses 112 and/or by moving in the second IR sensor 214 associated with the second lenses 122, the focal length of the second lenses 122 (or of the second IR sensor 214) can be increased by 15% to 65% of the focal length of the first lenses compared to the focal length of the first lenses 112 (or of the first IR sensors 212). For example, the focal length of the first lenses 112 can range from 15 mm to 25 mm, while the focal length of the second lenses 122, for example, can range from 25 mm to 35 mm.

The increased focal length results in the improved resolution described above for IR signals passing through the second lenses 122 onto the second IR sensor 214, and the increase in the radial detection range resulting therefrom.

As exemplarily shown in FIG. 3, the second area 120 can be formed in an approximate rectangular shape, i.e., the second area 120 has the contours of a rectangle, possibly tapered to a trapezoid, which can also have rounded corners as shown in FIG. 3. In this way, it is possible to identify the area with the increased radial detection range with the naked eye. This makes it possible to easily align a motion detector including the optical element 100 in such a way that the maximum radial detection range is achieved in monitoring regions that are of particular interest for this purpose, i.e., for example, in the direction of access roads, passageways or the like.

The monitoring area detectable by the second IR sensor 214 through the second lenses 122 then corresponds to a solid angle corresponding to, for example, a frustum of a pyramid with a square base and two aperture angles of 20°, 30°, 40°, or 50° in the horizontal and vertical directions.

The second IR sensor 214 is preferably aligned in such a way that its central line of sight pierces the center of the second area 120. As shown in FIG. 2, all IR sensors 210 and, in particular, the second IR sensor 214 can have an oblique downward directed line of sight, e.g., with an angle to the horizontal between 10° and 45°, such as 20°, which allows objects near the ground to be detected approaching the motion detector when the motion detector is installed at a height between 1.50 m and 3 m.

The second IR sensor 214 is thus provided with an increased radial detection range with respect to a monitoring area that can be easily adjusted through positioning of the second area. Outside this monitoring area, i.e., in the area in which the second IR sensor 214 or the first IR sensors 212 receive the IR radiation through the first lenses 112, the radial detection range is smaller. In this case, however, tangential motion is more likely, for which a detection range of approximately the same size can also be achieved with the first lenses 112.

As best shown in FIG. 4, the IR sensors 210 can be aligned in such a way that they collectively image the entire angular range from 0° to 360° in the horizontal plane. In the example of FIGS. 2 to 4, there are four IR sensors 210, each covering a range of approximately 90°. These detection ranges can overlap at their edges to improve detection reliability and resolution in the overlapping areas. Then, each IR sensor 210 covers an angular range of more than 90°, for example, an angular range of 92° to 125°. Furthermore, by tilting the IR sensors 210, detection from nearly horizontal to vertical can also be achieved. Thus, the complete sensor arrangement can be suitable for monitoring the entire lower hemisphere.

It is understood that the number of IR sensors 210 is not limited to four. Any number of IR sensors 210 may be used, depending on the configuration and functionality of the motion detector. Similarly, the shape of the optical element 100 is not limited to the shape shown in FIGS. 2 to 4. Rather, it will be adapted to the detection directions and desired detection ranges of the IR sensors 210 to ensure optimal signal transmission.

The decisive factor in this case is that the optical element 100 has at least one area that associates at least one IR sensor 214 with at least one second lens 122 that can be used to achieve a greater radial detection range than the first lenses 112 otherwise used in the optical element 100.

The invention claimed is:

1. An optical element (100) suitable for directing infrared radiation onto an infrared sensor (210) for detecting motion; wherein the optical element (100) has a first area (110), within which a plurality of first lenses (112) with an aperture from a first aperture range and a focal length from a first focal length range are arranged, and the optical element (100) has a second area (120), which lies within the first area (110) and has at least one second lens (122) with an aperture from a second aperture range with values which are greater than the values of the first aperture range, and/or with a focal length from a second focal length range with values which are greater than the values of the first focal length range; wherein the at least one second lens (122) protrudes from a surface of the optical element (100) defined by the first lenses (122) in the direction of incidence of the infrared radiation to be directed onto the infrared sensor (210).

2. The optical element (100) according to claim 1, wherein the at least one second lens (122) is a Fresnel lens and the first lenses (112) are spherical lenses.

3. The optical element (100) according to claim 1, wherein the optical element (100) has the shape of a partial sphere; and the second area (120) has a rectangular surface.

4. A device for detecting motion, including:

the optical element (100) according to claim 1, and at least one infrared sensor (210) for detecting motion, onto which the optical element (100) directs infrared radiation.

5. The device according to claim 4, wherein the device includes a plurality of infrared sensors (210) for detecting motion;

the plurality of infrared sensors (210) includes first infrared sensors (212) onto which infrared radiation is directed through only a portion of the first lenses (112); and the plurality of infrared sensors (210) includes at least one second infrared sensor (214) onto which infrared radiation is directed through a portion of the first lenses (112) and the at least one second lens (122).

6. The device according to claim 5, wherein the minimum distance of the at least one second infrared sensor (214) from the at least one second lens (122) is greater than minimum distances of the first infrared sensors (212) from the first lenses (112).

7. The device according to claim 4, wherein, if a central line of sight of the at least one second infrared sensor (214) defines an angle of 0°, a detection range of the at least one second infrared sensor (214) lies within an angular range of −20° to +20°; and the first infrared sensors (212) have detection ranges that lie at least partially outside the detection range of the at least one second infrared sensor (214).

8. The device according to claim 4, wherein the at least one second infrared sensor (214) has an oblique downward directed viewing angle when the device is mounted as intended.

* * * * *